United States Patent
Ozharar et al.

(10) Patent No.: US 12,399,056 B2
(45) Date of Patent: Aug. 26, 2025

(54) SNOW / WATER LEVEL DETECTION WITH DISTRIBUTED ACOUSTIC SENSING INTEGRATED ULTRASONIC DEVICE

(71) Applicant: NEC Laboratories America, Inc., Princeton, NJ (US)

(72) Inventors: Sarper Ozharar, Pennington, NJ (US); Yue Tian, Princeton, NJ (US); Ting Wang, West Windsor, NJ (US); Yangmin Ding, East Brunswick, NJ (US)

(73) Assignee: NEC Corporation, Tokyo (JP)

( * ) Notice: Subject to any disclaimer, the term of this patent is extended or adjusted under 35 U.S.C. 154(b) by 311 days.

(21) Appl. No.: 17/968,997

(22) Filed: Oct. 19, 2022

(65) Prior Publication Data

US 2023/0130862 A1 Apr. 27, 2023

Related U.S. Application Data

(60) Provisional application No. 63/270,656, filed on Oct. 22, 2021.

(51) Int. Cl.
*G01H 9/00* (2006.01)
*G01F 23/296* (2022.01)
(Continued)

(52) U.S. Cl.
CPC ............ *G01H 9/004* (2013.01); *G01F 23/296* (2013.01); *G01F 23/2962* (2013.01);
(Continued)

(58) Field of Classification Search
CPC ... G01H 9/004; G01F 23/296; G01F 23/2962; G01N 23/203; G01S 7/52093;
(Continued)

(56) References Cited

U.S. PATENT DOCUMENTS 7,021,146 B2 * 4/2006 Nash .................... G01V 1/3835
367/134
8,661,907 B2 * 3/2014 Davis ................. G01D 5/35383
73/643
(Continued)

FOREIGN PATENT DOCUMENTS

CN 108151721 A * 6/2018 ............ G01C 15/00
CN 209131792 U * 7/2019
(Continued)

OTHER PUBLICATIONS

CN-108151721-A, English Translation (Year: 2018).*
(Continued)

*Primary Examiner* — Ryan D Walsh
(74) *Attorney, Agent, or Firm* — Joseph Kolodka

(57) ABSTRACT

Aspects of the present disclosure describe snow/water level detection using distributed fiber optic sensing/distributed acoustic sensing (DFOS/DAS) and an integrated ultrasonic device that advantageously operates over existing optical
(Continued)

telecommunications facilities carrying live telecommunications traffic—or optical facilities deployed specifically for such detection. DFOS/DAS monitoring of snow/water level advantageously monitors large areas with high sensitivity while exhibiting robustness to changing environmental conditions and employs a remote (utility pole or other mounting) mounted ultrasonic sensor/transducer that provides snow/water level data in real-time as a coded vibrational signal.

8 Claims, 4 Drawing Sheets

(51) Int. Cl.

| | |
|---|---|
| *G01F 23/2962* | (2022.01) |
| *G01N 23/203* | (2006.01) |
| *G01S 7/52* | (2006.01) |
| *G01S 15/08* | (2006.01) |
| *G01S 15/89* | (2006.01) |
| *G01W 1/14* | (2006.01) |
| *H04Q 9/00* | (2006.01) |

(52) U.S. Cl.
CPC ........ *G01N 23/203* (2013.01); *G01S 7/52093* (2013.01); *G01S 15/8965* (2013.01); *G01S 15/8977* (2013.01); *G01W 1/14* (2013.01); *H04Q 9/00* (2013.01); *G01S 15/08* (2013.01)

(58) Field of Classification Search
CPC .. G01S 15/8965; G01S 15/8977; G01S 15/08; G01W 1/14; H04Q 9/00
See application file for complete search history.

(56) References Cited

U.S. PATENT DOCUMENTS

| | | | |
|---|---|---|---|
| 11,619,542 B2 * | 4/2023 | Ozharar | G01H 13/00 385/12 |
| 2017/0176587 A1 * | 6/2017 | Aoki | H01Q 19/185 |
| 2018/0058899 A1 * | 3/2018 | Igawa | G01S 13/88 |
| 2021/0318162 A1 * | 10/2021 | Hu | G01K 11/32 |
| 2023/0377179 A1 * | 11/2023 | Jiang | G06V 20/52 |
| 2023/0412266 A1 * | 12/2023 | White | G01D 5/35358 |

FOREIGN PATENT DOCUMENTS

| | | | |
|---|---|---|---|
| CN | 111535396 A | * | 8/2020 |
| JP | H07113877 A | * | 5/1995 |
| JP | 2010032381 A | * | 2/2010 |

OTHER PUBLICATIONS

CN-111535396-A, English Translation (Year: 2020).*
CN-209131792-U, English Translation (Year: 2019).*
JP-2010032381-A, English Translation (Year: 2010).*
JP-H07113877-A, English Translation (Year: 1995).*

* cited by examiner ated ultrasonic device.

SNOW / WATER LEVEL DETECTION WITH DISTRIBUTED ACOUSTIC SENSING INTEGRATED ULTRASONIC DEVICE

CROSS REFERENCE

This application claims the benefit of U.S. Provisional Patent Application Ser. No. 63/270,656 filed 22 Oct. 2021, the entire contents of which being incorporated by reference as if set forth at length herein.

TECHNICAL FIELD

This disclosure relates generally to distributed fiber optic sensing (DFOS) systems, methods, and structures. More particularly it discloses the use of DFOS/distributed acoustic sensing (DAS) in combination with an ultrasonic device to determine/monitor a snowfall and/or flood water depths in real-time.

BACKGROUND

As is known by those skilled in the art, distributed fiber optic sensing (DFOS) uses physical properties of light as it travels along an optical fiber to detect changes in temperature, strain, vibration, and other parameters. DFOS uses the optical fiber as a sensor that provides a continuous array of sensor points along the length of the optical fiber.

Distributed acoustic sensing (DAS) is a sensing technology built on the generalized DFOS that provides real time, spatially resolved acoustic and vibration output data from virtually unlimited points along the length of the optical fiber (or fiber optic cable) DAS effectively turns common optical fiber-even that conveying live telecommunications traffic-into a series of thousands of acoustic microphones or vibration sensing devices. Advantageously, DAS produces thousands of channels of output from these virtual microphones/vibration sensing devices in real time.

Flood and snow depths are critical values that need to be monitored closely for the safety of people, traffic, and infrastructure. And while methods do exist to monitor these conditions, they are oftentimes inconvenient, slow, and not available in rural locations.

SUMMARY

The above problem is solved and an advance in the art is made according to aspects of the present disclosure directed snow/water level detection using distributed acoustic sensing and an integrated ultrasonic device.

In sharp contrast to the prior art, snow/water level detection according to aspects of the present disclosure operates over existing optical telecommunications facilities that carry live telecommunications traffic—or optical facilities deployed specifically for such detection/monitoring.

Viewed from a first aspect, the present disclosure is directed to DFOS monitoring of snow/water level that advantageously monitors large areas with high sensitivity while exhibiting a robustness to changing environmental conditions.

Viewed from another aspect, the present disclosure is directed to the DOFS monitoring of snow/water level that employs a remote (utility pole or other mounting) mounted ultrasonic sensor that provides snow/water level data in real-time as a coded vibrational signal.

BRIEF DESCRIPTION OF THE DRAWING

A more complete understanding of the present disclosure may be realized by reference to the accompanying drawing in which.

DESCRIPTION

Figure 1:
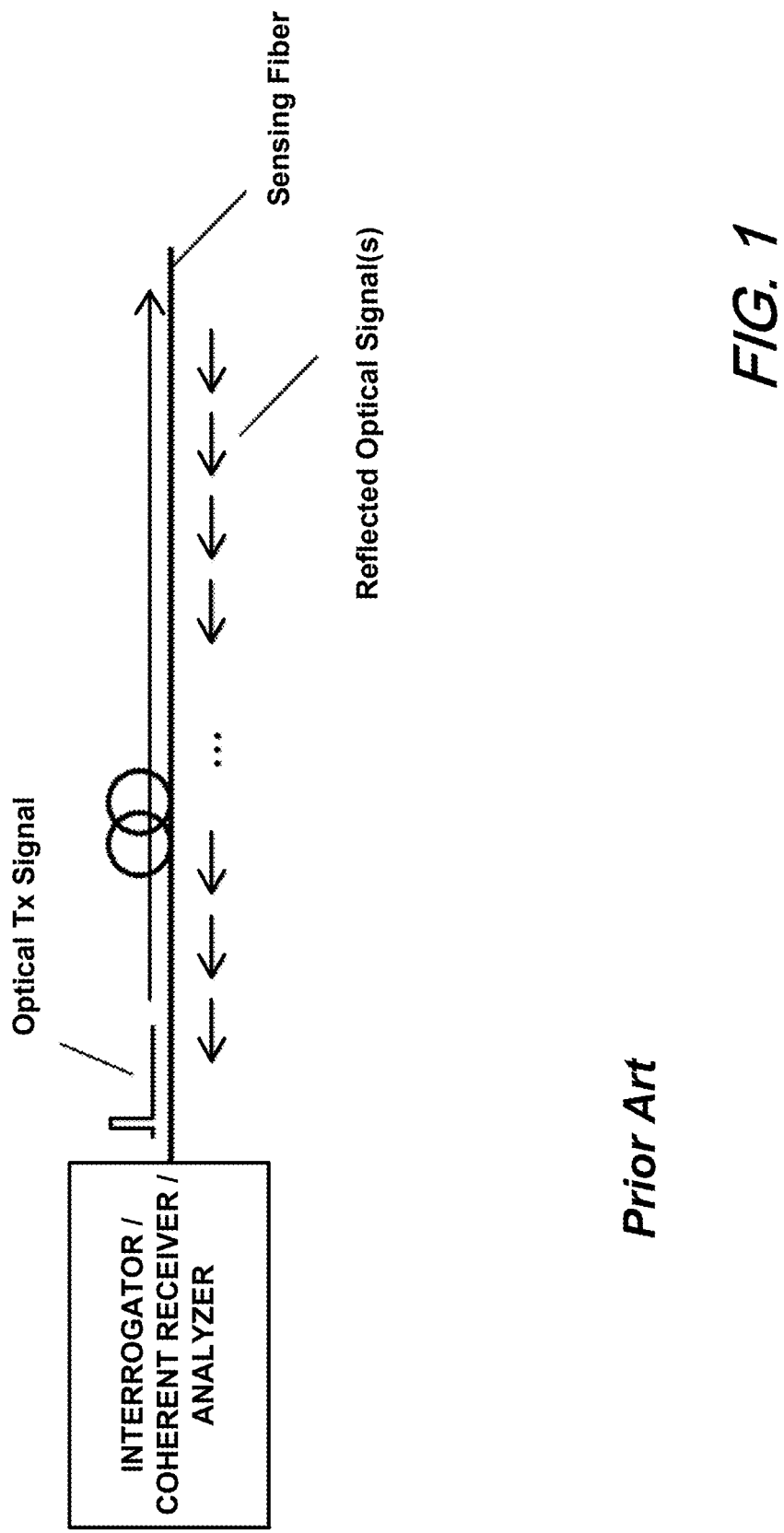
FIG. 1 is a schematic diagram illustrating a DFOS system known in the art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1 is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. As will be understood and appreciated, the interrogator may include a coded DFOS system that may employ a coherent receiver arrangement known in the art.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables-physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber that may be part of a larger, multi-fiber cable.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

As previously noted, distributed fiber optic sensing (DFOS) technologies have been widely studied and developed for decades, due to their ability to monitor environmental variables (such as temperature, strain, vibration, acoustic, etc.) with long sensing distance and high accuracy. Of particular interest, Rayleigh-based DFOS have been used in a wide range of applications, including the distributed acoustic sensing (DAS), distributed vibration sensing (DVS), and the distributed temperature/strain sensing (DTSS).

As we have noted, flooding and high snow levels are critical values that need to be monitored closely to ensure the safety of people, traffic, and infrastructure. Presently, there exist some techniques for snow level or water level monitoring which involve some ultrasonic distance measurement or a video camera and image processing software.

As is known, camera-based approaches typically require external power, good lighting conditions (extra lighting for night time), and an external communication system. Similarly, ultrasonic measurement approaches also require external power and an external communication system to convey measured snow/water levels to a receiving/reporting station, i.e., central office. Comparing the two approaches, ultrasonic approaches tend to exhibit a lower cost and greater dependability relative to camera/imaging approaches. Notwithstanding, the need for communication of measured snow/water levels is a critical infirmity of existing approaches-especially in rural areas.

As we shall show and describe, the present disclosure is directed to a DFOS sensing system for snow/water level monitoring that does not require a separate communications facility. Of particular importance, our inventive DFOS system operates over existing optical telecommunications facilities-even those carrying live telecommunications traffic. Since such telecommunications facilities are typically engineered to survive serious environmental conditions and potential loss of commercial power, our inventive DFOS system for monitoring snow/water level advantageously exhibits similar reliabilities.

Figure 2:
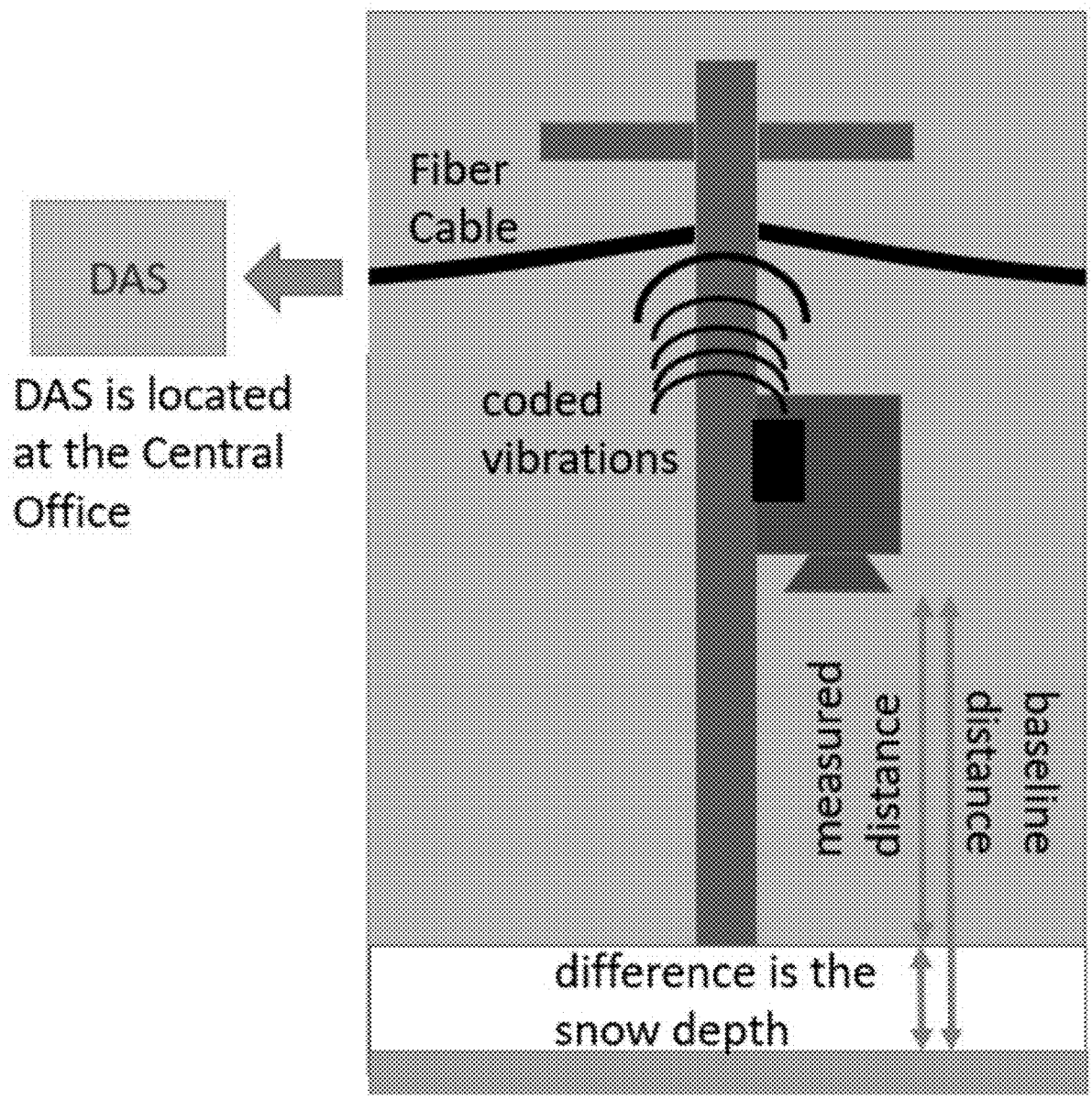
FIG. 2 is a schematic diagram showing illustrative utility pole mounted ultrasonic device and optical fiber sensor cable providing DOFS according to aspects of the present disclosure.

FIG. 2 is a schematic diagram showing illustrative utility pole mounted ultrasonic device and fiber optic sensor cable providing DOFS according to aspects of the present disclosure. With reference to that figure, we note that such utility pole may include a solar/battery powered ultrasonic device (electronic actuator) that is mounted to the pole. The ultrasonic actuator includes an ultrasonic sensor that is directed downward and continuously or periodically (as pre-determined or controlled remotely) measures a distance between the sensor and the ground and is initially measured as a baseline value.

In the event of a snowfall and resulting snow accumulation or rising water due to flood or other event, the distance between ultrasonic sensor and the ground level will change. More particularly, as the snow or water depth increases the distance between the ultrasonic sensor and the top of the snow/water will decrease. The difference between the previously determined baseline and this newly measured shorter distance is the measured depth of the snow or water. Once this depth level is measured, it is transmitted to a receiving station/central office.

For our purposes according to the present disclosure, purpose, the ultrasonic actuator device includes a transducer/speaker that acts as a mechanical vibrator to the DFOS/DAS fiber optic sensor cable. Based on the depth level, it generates a particular vibration pattern, wherein the snow/water depth level is coded in the frequency of the vibration, duration of the vibration and repetition of the vibration. Then this coded vibration pattern is generated the actuator generates a mechanical vibration which in turn vibrates the utility pole and the fiber optic sensor cable. The operational DFOS/DAS system detects, localizes and decodes this generated mechanical vibration to obtain the snow/water depth level information. Hence, the depth level is transmitted via DFOS/DAS to a central office by a coded vibrational pattern.

As those skilled in the art will understand and appreciate, by using our inventive method and apparatus, multiple, low-cost snow/water flood depth level monitoring devices can be installed along a tens of kilometers long fiber route and be monitored in real-time by a single optical sensor fiber that is part of a DFOS/DAS system. Again, such optical sensor fiber may be a live telecommunications facility carrying live telecommunications traffic simultaneously.

As those skilled in the art will now appreciate, one aspect of the present disclosure is the use of a transducer as a vibrating element and transmitting depth information as coded mechanical vibrations to be detected by a DFOS/DAS system. Advantageously, there is no need to identify and label each sensor individually, since the DFOS/DAS system monitors all sensors simultaneously and detects their individual locations and any transmitted data as well.

Additionally, the coding of the measured depth level information into a vibration pattern allows for the mapping of a particular depth level value with cm resolution into a vibration pattern, which is then detected, localized, and decoded by the DFOS/DAS system.

Finally, by using DFOS/DAS, multiple ultrasonic/transducer devices can be installed along a fiber route without any special synchronization or timing considerations. Even if multiple sensors generate vibration patterns simultaneously, the DFOS/DAS system reconciles the different vibrational sources and their locations without conflict.

Figure 3:
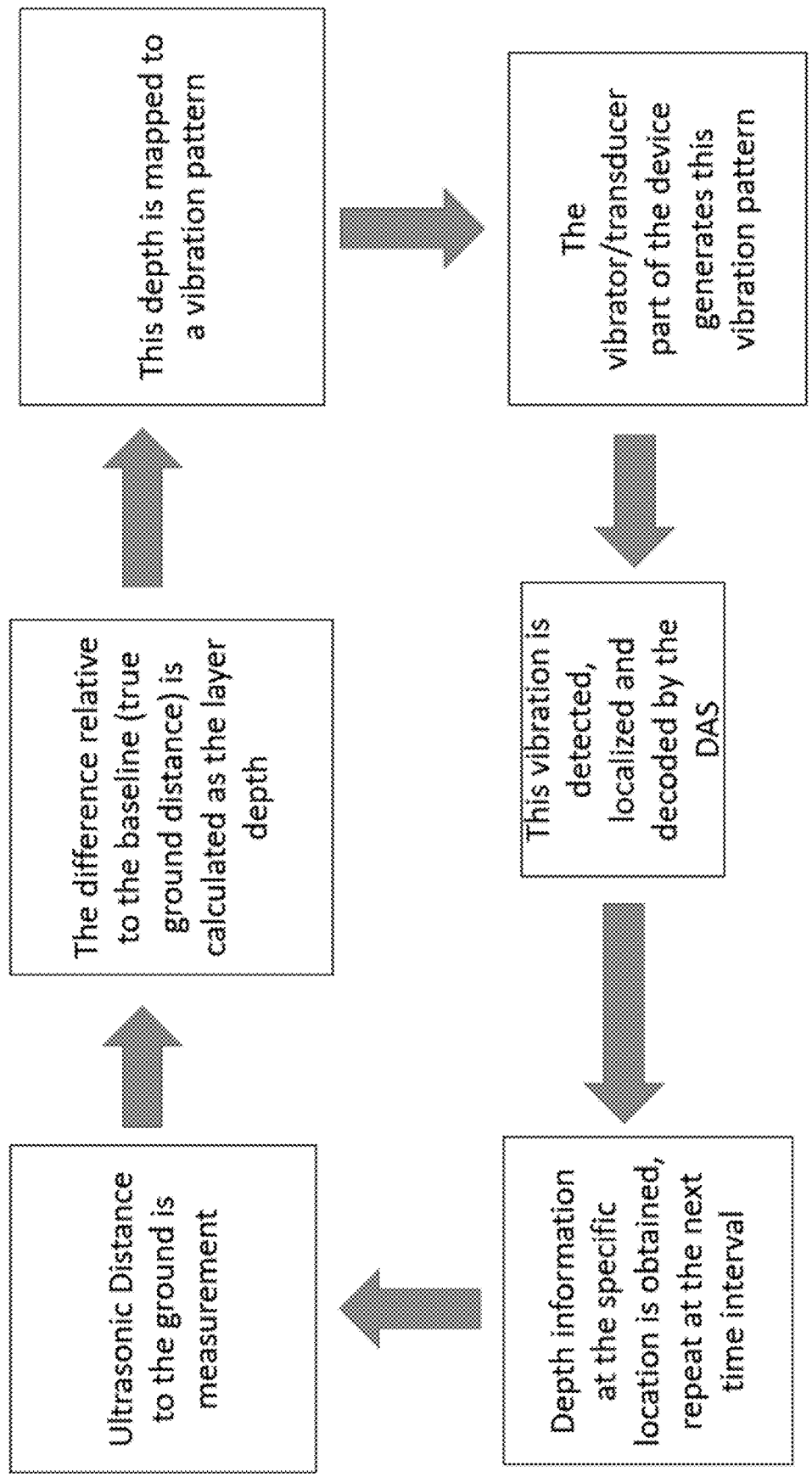
FIG. 3 is a schematic flow diagram showing illustrative operation of snow/water depth (level) according to aspects of the present disclosure.

FIG. 3 is a schematic flow diagram showing illustrative operation of snow/water depth (level) according to aspects of the present disclosure.

With reference to that figure, we note that operationally the ultrasonic/transducer device is mounted on a pole at approximately 5 meters high above ground, with its ultrasonic sensor directed downward toward the ground.

The ultrasonic/transducer device measures the distance from itself to the ground level. This distance is taken as baseline (0 cm depth).

The ultrasonic/transducer device makes distance measurement at previously adjusted time intervals, such as once every day, or every hour, or every minute, or any other time interval.

Once the distance to the ground was measured as shorter than the baseline (i.e. the ground level has risen due to snow or water) the difference is taken as the new depth level let's say it is 23 cm.

This depth value is mapped to a vibration pattern in a one-to-one fashion.

The vibration pattern will have a center frequency and a duration. For a depth value of digits, the frequency of the vibration can be defined as:

$$F=400\ Hz+D1*50\ Hz,$$

Where D1 is the ones digit of the depth.

The duration of the vibration can be defined as:

$$(D2+1)*0.5\ seconds,$$

where D2 is the tens digit of the depth.

For example, if the depth is 23 cm, then tens digit D2=2, and the ones digit D1=3, this results in a vibration pattern:

$$F=400\ Hz+3*50\ Hz=550\ Hz$$

$$Duration=(2+1)*0.5\ s=1.5\ seconds.$$

Some other examples are:

00 cm depth=>$F$=400 Hz for 0.5 seconds;

09 cm depth=>$F$=850 Hz for 0.5 seconds; and 17 cm depth=>$F$=750 Hz for 1 second.

An upper depth level of 30 cm can also be specified so that any depth equal and above 30 cm will be mapped to a vibration pattern of F=900 Hz for 1 second.

Those skilled in the art will understand and appreciate that this is only illustrative/example coding and that other convenient coding techniques may be employed.

Once such a measurement is done locally at the device site, the generated pattern will be detected and localized via DOFS/DAS. Based on the duration and the frequency of the vibration data so detected and localized, the depth level information can be obtained for that specific location.

Figure 4:
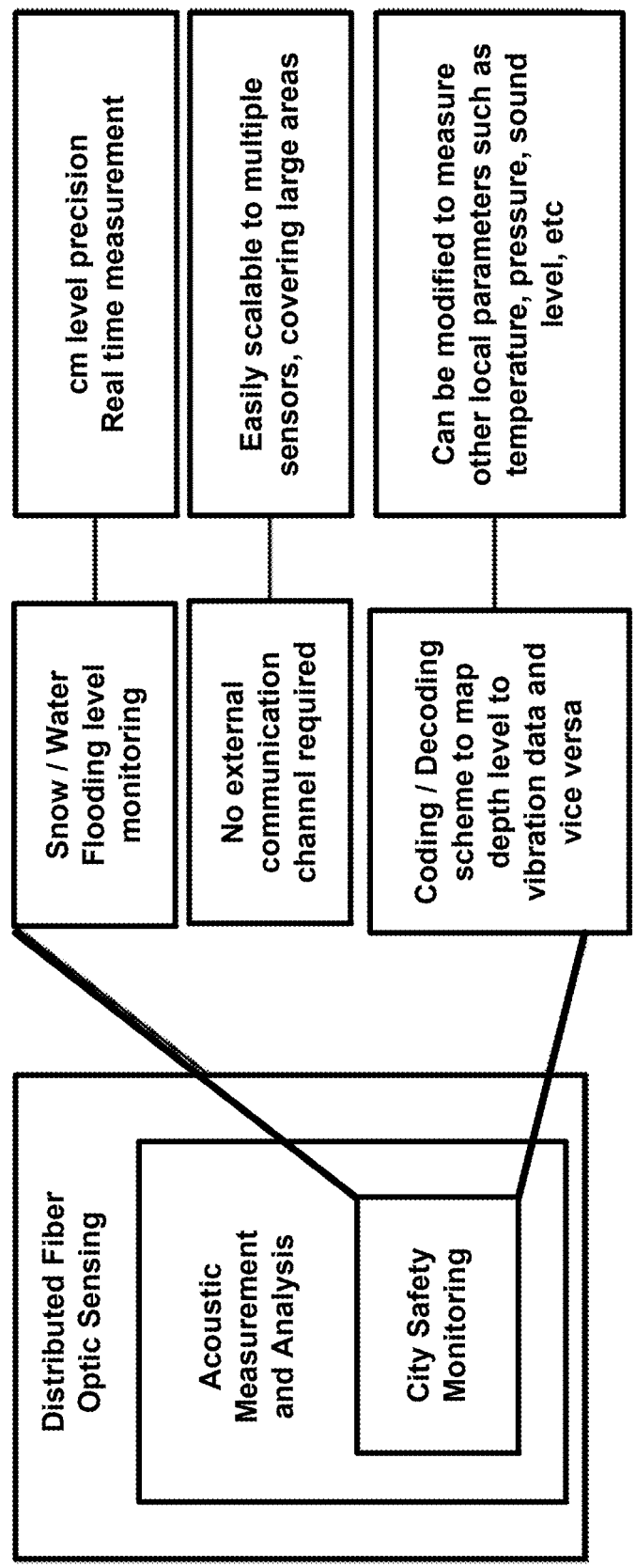
FIG. 4 shows illustrative features associated with DFOS/ultrasonic snow/water depth monitoring according to aspects of the present disclosure.

FIG. 4 shows illustrative features associated with DFOS/ultrasonic snow/water depth monitoring according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensing (DFOS) system comprising:
 a length of optical sensor fiber;
 a DFOS interrogator that generates optical pulses at one or more frequencies, introduces the generated pulses into the length of optical sensor fiber, receives backscattered signals from the length of optical sensor fiber, and determines from the backscattered signals acoustic/vibrational activity occurring at one or more points along the length of the optical sensor fiber;
 an ultrasonic transducer positioned at a location along the length of the optical sensor fiber, said ultrasonic transducer positioned above ground level, and configured to:
  determine a baseline distance between the ultrasonic transducer and the ground;
  determine a measured distance between the ultrasonic transducer and the ground;
  determine a snow/water level from a difference between the baseline distance and the measured distance; and
  encode the snow/water level into a vibration pattern that is mechanically produced by the ultrasonic transducer, the mechanical vibration pattern producing mechanical vibrations in the length of optical sensor fiber for detection by the DFOS interrogator;
 wherein said DFOS interrogator is further configured to determine the snow/water level from the backscattered acoustic signals;
 wherein the DFOS interrogator is further configured to determine a location along the length of the optical sensor fiber at which the snow/water level is determined;
 wherein the snow/water level is mapped to a vibration pattern in a one-to-one manner;
  wherein the vibration pattern exhibits a center frequency and a duration; and
 wherein the snow/water level is represented as a series of digits, wherein a ones digit of the snow/water level is D1, and the frequency of the vibration pattern F, is represented by:

$$F=400\ Hz+D1*50\ Hz.$$

2. The system of claim 1 wherein a duration of the vibration pattern $D_{vp}$, is represented by:

$$D_{vp}=(D2+1)*0.5\ seconds$$

where D2 is the tens digit of the snow/water level.

3. The system of claim 1 wherein a snow/water level is pre-determined, and any snow/water level greater than the pre-determined level is mapped to a maximum pre-determined vibration pattern.

4. The system of claim 3 wherein the maximum pre-determined vibration pattern includes a 900 Hz frequency of vibration pattern for a 1 second duration.

5. The system of claim 3 wherein the DFOS system includes one or more of distributed acoustic sensing (DAS), distributed vibration sensing (DVS), and distributed temperature sensing (DTS).

6. The system of claim 5 wherein the optical sensor fiber is included in an optical cable that has a plurality of optical fibers.

7. The system of claim 6 wherein the optical cable includes a plurality of optical sensor fibers.

8. The system of claim 1 wherein the length of optical sensor fiber carries live telecommunications traffic simultaneously with the DFOS pulses and backscatter signals.

* * * * *